(No Model.)
H. W. RUTON & H. A. GORE.
BROADCAST SEED SOWER.
No. 409,373. Patented Aug. 20, 1889.
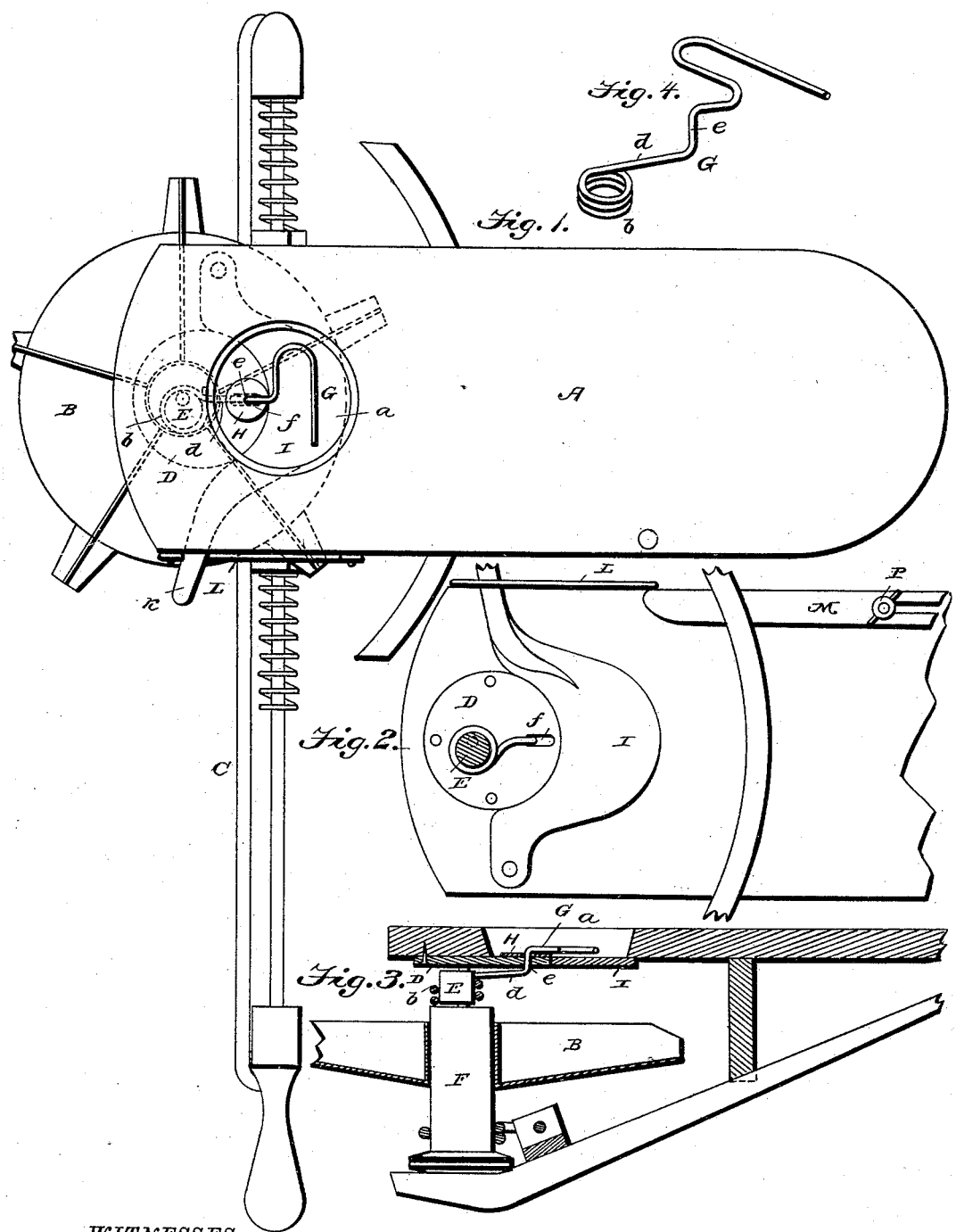
WITNESSES
INVENTORS
HIRAM W. RU TON.
HENRY A. GORE.

UNITED STATES PATENT OFFICE.

HIRAM W. RU TON AND HENRY A. GORE, OF GOSHEN, INDIANA.

BROADCAST SEED-SOWER.

SPECIFICATION forming part of Letters Patent No. 409,373, dated August 20, 1889.

Application filed April 26, 1889. Serial No. 308,716. (No model.)

*To all whom it may concern:*

Be it known that we, HIRAM W. RU TON and HENRY A. GORE, citizens of the United States, residing at Goshen, in the county of Elkhart and State of Indiana, have invented certain new and useful Improvements in Broadcast Seed-Sowers; and we do declare the following to be a full, clear, and exact description of the invention, such as will enable others skilled in the art to which it appertains to make and use the same.

This invention has relation to improvements in broadcast seed-sowers, and the novelty will be fully understood from the following description and claims when taken in connection with the accompanying drawings, in which—

Figure 1 is a plan view of our improved device with the seed-sack removed. Fig. 2 is an inverted plan view of the forward portion with the distributer-wheel removed and the cam shown in section. Fig. 3 is a vertical longitudinal sectional view of the forward portion of the machine, and Fig. 4 is a view of the agitator removed.

Referring by letter to the said drawings, A indicates the main frame, B the distributer-wheel, and C the operating-handle, all of which may be of any ordinary or approved construction.

The base of the main frame is provided near its forward end with a seed-hole or discharge-aperture *a*.

D indicates a circular plate, which is arranged so as to have a part of it extend within the aperture *a* and from the forward portion thereof, thereby leaving exposed for the passage of the grain an aperture of approximately crescent shape. This plate D has journaled in its under side the eccentric stud or lug of the cam-shaft E, the opposite end of which is secured to the spool F.

G indicates an agitator, which is preferably formed from wire, although it may be formed from other suitable material. This agitator is best shown in Fig. 4 of the drawings, having an eye *b*, which is preferably formed by coiling the wire at one end to receive the cam-shaft E. This wire has a branch *d*, which is carried horizontally and rearwardly from the eye *b*, and from the outer end of this branch *d* an upward branch *e* is formed, which is designed to pass through an elongated slot *f*, formed in the plate D, and the said wire terminates in a loop or other suitable configuration to form an agitator above the feed-plate and within the grain-hole *a*.

H indicates a sliding plate, which is provided with an eye to receive the vertical branch of the agitator and is designed to cover the slot *f*, formed in the plate D, so as to prevent the same from choking with grain during operation.

By this construction it will be seen that when the spool and cam-shaft have been rotated by the action of the operating-rod the said agitator will be given a rotary reciprocation alternately in opposite directions and effectually serve to feed the grain and prevent the same from choking in its passage from the machine.

I indicates a feed or grain plate. This plate has its forward longitudinal edge recessed in a shape corresponding with the semicircular edge of the plate D, and when closed these plates are adapted to snugly engage each other. This plate I is pivoted at one end to the under side of the main frame and has its opposite end terminating in a handle portion K, which extends through a guide-loop L, depending from the said frame. It will be here observed that the opening for the discharge of the grain is of approximately crescent form, and as such will perform very effectively in feeding the grain to the distributer-wheel.

M indicates a slide-bar, which is held to the under side of the main frame by a suitable guide. The forward end of this bar is adapted to limit the opening movement of the plate I and is adjustably held in position by means of a thumb-screw P, which passes through a slot in the said bar.

We do not wish to be understood as confining ourselves to any special form of agitator, although the form shown is preferable, yet it is obvious that the agitator-frame may terminate in any suitable shape. We attach importance, however, to the fact that the agitator receives its motion directly from the cam-shaft and passes through one of the seed-plates into the seed-aperture.

Having described our invention, what we claim is—

1. The combination, with the main frame, of the pivoted plate having its forward edge provided with a curvilinear recess and adapted to regulate the opening of the seed-aperture, the slotted plate having its curvilinear edge extending partly within said aperture, the agitator passing through the slot in said plate with its agitator branch above the plate, and its opposite end connected with the cam-shaft of the spool, substantially as specified.

2. The combination, with a seed-plate having an elongated slot, of the agitator passing through said slot with its agitating branch above the plate and its opposite end connected with the cam-shaft of the spool, and a plate or disk arranged on said agitator so as to cover the slot in the plate, substantially as specified.

In testimony whereof we affix our signatures in presence of two witnesses.

HIRAM W. RUTON.
HENRY A. GORE.

Witnesses:
FRED H. NIEDEMUER,
WALTER B. PIATT.